June 30, 1970    A. TEICH    3,517,549
MOISTURE-SENSING DETECTOR AND APPARATUS INCLUDING SAME
Filed June 16, 1966
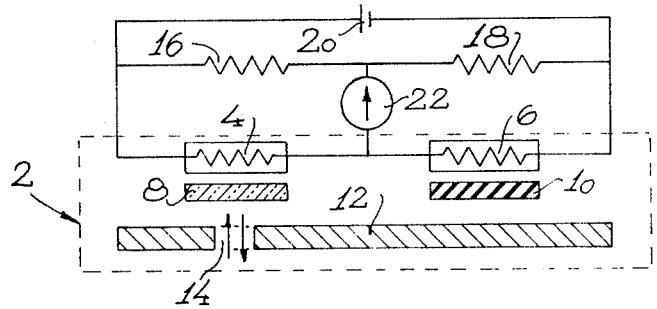
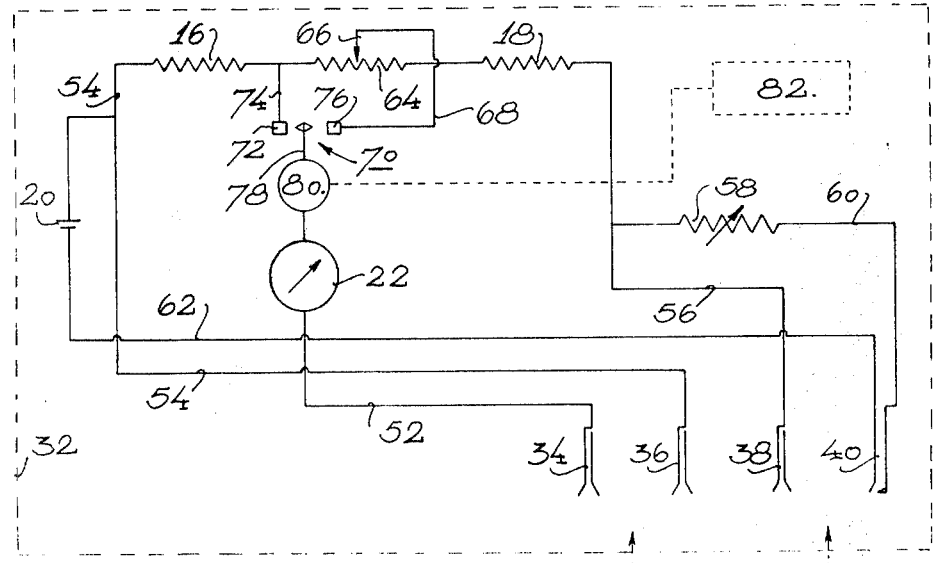
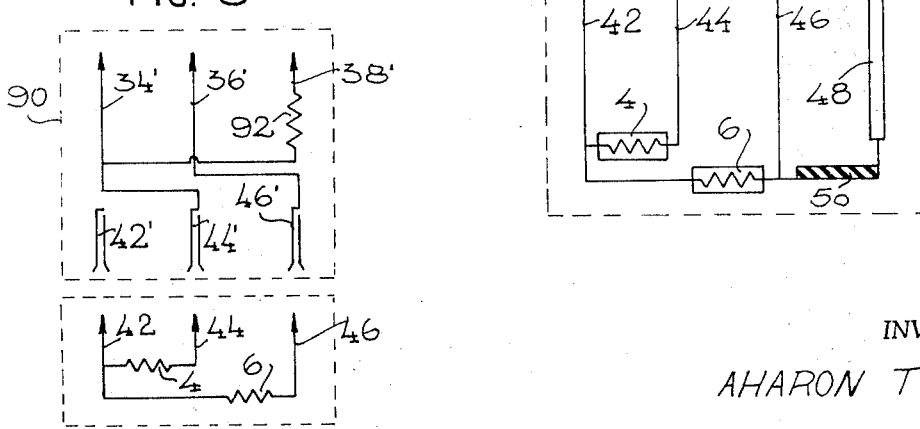
INVENTOR
AHARON TEICH
BY *Benjamin J. Barish*
ATTORNEY

United States Patent Office 3,517,549
Patented June 30, 1970

3,517,549
MOISTURE-SENSING DETECTOR AND
APPARATUS INCLUDING SAME
Aharon Teich, 4 Simtat Hamaalot,
Ramat Hasharon, Israel
Filed June 16, 1966, Ser. No. 558,106
Claims priority, application Israel, June 22, 1965, 23,783
Int. Cl. G01n 25/18, 27/18, 25/56
U.S. Cl. 73—73                                8 Claims

ABSTRACT OF THE DISCLOSURE

A moisture-sensing detector comprises a pair of electrical resistors one of which is in heat-conductive relationship with a moisture-absorbing material and the other of which is in heat-conductive relationship with a nonmoisture-absorbing material, whereby the difference in thermoconductance between the latter two materials, caused by the absorption of moisture by the one but not by the other, may be used to produce an indication of the amount of moisture absorbed by the first-mentioned material.

---

The present invention relates to a novel moisture-sensing detector, and to apparatus including such detector for measuring moisture and/or for operating a device in response to the presence or absence of moisture.

A particular application for such a moisture-sensing detector and apparatus is in the measurement of soil moisture, and therefore the invention will hereinafter be described with respect to this application. Various types of such devices have been proposed, but in most cases they are unduly expensive or do not produce accurate and reliable results with changes in temperature, condition of the soil, and composition of the soil.

An object of the present invention is to provide an inexpensive moisture-sensing detector, and apparatus including such a detector, which will give reliable results and which will be substantially unaffected by changes in temperature, condition of the soil, and the composition of the soil.

Briefly, according to the invention there is provided a detector for sensing the moisture content of a medium, characterized in that it includes a first and a second electrical resistor the resistances of each of which varies with temperature, the first electrical resistor being in heat-conductive relationship with a moisture-absorbing material the thermoconductance of which varies with the amount of the moisture, the second electrical resistor being in heat-conductive relationship with a nonmoisture-absorbing material having approximately the same temperature conductivity factor as the moisture-absorbing material.

According to further features, there is provided apparatus for measuring the moisture content of a medium, the apparatus including a moisture-sensing detector as described above and a bridge measuring circuit two arms of which include the first and second electrical resistors mentioned above. The apparatus further includes means for connecting the first and second electrical resistors in series to form one arm of the bridge and for introducing a further electrical resistor to form another arm of the bridge, the latter resistor adapting the apparatus for also measuring temperature.

Further features and advantages of the invention will be apparent from the description below.

The invention may take several forms, but is herein described with reference to the accompanying drawings which illustrate, somewhat diagrammatically and for purposes of example only, two embodiments of the invention.

In the drawings:

FIG. 1 is a schematical diagram illustrating a simplified embodiment of the invention;

FIG. 2 is a schematical diagram illustrating another embodiment of the invention; and FIG. 3 illustrates the use of an adapter with the embodiment of FIG. 2.

The flow of heat may be represented as follows:

$$dQ/d\theta = -kA(dt/dx) \qquad (1)$$

wherein $dQ/d\theta$ (quantity per unit time) is the rate of heat flow; $A$ is the area at right angles to the direction of heat flow; $-dt/dx$ is the rate of change of temperature with distance, or the temperature gradient; and the factor $k$ is the thermal conductivity, which is dependent on the material, its composition and density and also the temperature at which the heat flows.

Thermal conductivity is defined as the quantity of heat passing per unit time through a plate of unit area and unit thickness at a unit temperature differential. Thermal conductivity ($k$) can be stated as follows:

$$k = \text{g.-cal.}/(\text{sec.})(\text{sq. cm.})(^\circ \text{C.}/\text{cm.}) \qquad (2)$$

This is the quantity of heat in gram calories transmitted per second through a plate of material one centimeter thick and one square centimeter in area, when the temperature difference between the two sides of the plate is one degree centigrade.

$k$ for water at 20° C. is approximately $6 \times 10^5$ $k$ for air at 20° C. is approximately $1.4 \times 10^3$ From the above it can be seen that $k$ for a plate of low bulk density will vary according to the relative amounts of air and/or water it contains, or otherwise the relative amounts of gas and liquid if their thermal conductivities differ. It is this property which is made use of in the present invention to measure moisture.

FIG. 1 illustrates a simplified measuring apparatus constructed in accordance with the invention. In FIG. 1, the moisture-sensitive detector is generally indicated by the reference numeral 2. It includes a first electrical resistor 4 and a second electrical resistor 6, the resistance of each of which varies with temperature. Resistor 4 is in heat-conductive relationship with a moisture-absorbing material 8 the thermoconductance of which varies with the amount of moisture absorbed. Resistor 6 is in heat-conductive relationship with a nonmoisture absorbing material 10 having approximately the same temperature conductivity factor as the moisture-absorbing material 8.

Preferably, moisture-absorbing material 8 is in the form of a layer or plate in direct contact with resistor 4, and nonmoisture-absorbing material 10 is also in the form of a layer or plate in direct contact with electrical resistor 6. For purposes of example, moisture-absorbing material 8 may be of asbestos, and nonmoisture-absorbing material 10 may be of rubber or of synthetic resin having approximately the same temperature conductivity factor as asbestos.

The detector 2 further includes a plate 12 placed over both of the electrical resistors, preferably in contact with layers 8 and 10. It may constitute the housing for the detector. Plate 12 is of high thermic conductance (e.g., copper or aluminum) and is formed with an opening 14 for permitting the passage of moisture to the moisture-absorbing material 8. This plate thus keeps both resistors 4 and 6 at substantially the same temperature, and therefore any ambient temperature changes affecting resistor 4 will similarly affect resistor 6.

The resistors 4 and 6 form two arms of a Wheatstone bridge measuring circuit, the other two arms of which are indicated by resistors 16 and 18. As in a conventional Wheatstone bridge arrangement, the power supply 20 is connected across opposite junctions of the bridge, and a meter 22, or other current measuring device, is connected across the remaining junctions of the bridge.

The operation of the circuit of FIG. 1 will be apparent from the above description.

In the dry state, the thermoconductivities of plates 8 and 10 are equal. Therefore, the rate of heat dissipation in the two resistors 4 and 6 will be equal, which means that their temperatures (and their resistances) will be equal, and the bridge will be balanced.

As moisture-absorbing plate 8 absorbs moisture, electrical resistor 4 wil lose heat faster than resistor 6, because of the higher thermic conductance of material 8. Accordingly, its temperature, and therefore its resistance, will vary, the degree of variation being in accordance with the amount of moisture absorbed by material 8. This change in resistance unbalances the bridge and is visually indicated by meter 22, which could be graduated in accordance with moisture content. If desired, means could be provided (as to be described in FIG. 2 example below) for rebalancing the bridge, the amount of the rebalancing then providing the indication of the measured quantity of moisture absorbed by material 8.

FIG. 2 illustrates a further embodiment of the invention. In FIG. 2, the moisture-sensing detector is generally designated by the reference numeral 30, and the measuring circuit is generally designated by the reference numeral 32. The detector includes resistors 4 and 6 in the same constructional arrangement as described with reference to FIG. 1, and the measuring circuit 32 includes resistors 16 and 18 also as in the FIG. 1 arrangement. Further, as in FIG. 1, battery 20 is connected across opposite junctions of the bridge, and meter 22 is connected across the remaining junctions of the bridge.

In the embodiment of FIG. 2, the measuring circuit including the battery 20 and the meter 22 are contained in a separate unit indicated by the broken lines 32, and the detector indicated by broken lines 30 is contained in a separate unit detachably connectable to the measuring unit 32. For this purpose, the measuring unit 32 is provided with jacks or sockets 34, 36 and 38, and with a normally open switch 40; and the detector is provided with plugs 42, 44 and 46, and with a conductive prong 48 adapted to close switch 40 when the detector is attached. Resistor 40 is connected between plugs 42 and 44, and resistor 6 is connected between plugs 42 and 46. Conductive prong 48 is insulated from these resistors by insulation, generally designated 50.

Within the meter unit, socket 34 is connected by conductor 52 to the meter 22; socket 36 is connected by conductor 54 to the junction of one side of the battery 20 and resistor 16; and socket 38 is connected by conductor 56 to the junction of resistor 18 and a calibrating resistor 58. The other side of the calibrating resistor is connected, through conductor 60, normally open switch 40, and conductor 62, to the other side of battery 20.

The bridge further includes another resistor 64 having a variable tap 66 connected by conductor 68 through a "calibrate-test" switch 70 to meter 22. The "calibrate-test" switch includes a "calibrate" contact 72 connected by conductor 74 to the junction between resistor 16 and 64, and a "test" contact 76 connected to conductor 68 and tap 66. The movable contact 78 of the switch is connected to the meter 22.

If desired, a relay 80 or other actuating device may be included in the circuit with the meter 22 so as to actuate an external device, such as a water control valve 82, in response to the measurement taken by the bridge. It will also be appreciated that meter 22 could be omitted so that the measuring circuit will merely actuate the external device in response to the measurement, without providing a visual indication of the measurement.

The operation of the FIG. 2 circuit will be apparent from the foregoing description. Assuming switch 70 is in the "test" position, its contact 78 engaging contact 76, it will be seen that when detector 30 is attached to the measuring unit 32, the same type of bridge circuit as illustrated in FIG. 1 is established through plugs 42, 44 and 46 received in sockets 34, 36 and 38, respectively. In addition, prong 48 closes switch 40. The difference in resistances between resistors 4 and 6 resulting from the difference in thermoconductance of moisture-absorbing material 8 and nonmoisture-absorbing material 10, which is a function of the amount of moisture as described earlier, unbalances the bridge and causes a reading to be produced on meter 22. Variable tap 66 is then adjusted until the bridge is balanced. Tap 66 is calibrated such that the amount of the adjustment to rebalance the bridge provides an indication of the quantity of the moisture.

To calibrate the measuring unit, movable contact 78 is connected to contact 72, and then calibrating resistor 58 is adjusted until the bridge is balanced as indicated by meter 22.

The device illustrated in FIG. 2 may be selectively adapted for also measuring temperature. To do this, both of the resistors 4 and 6 are connected in series, and a further resistor is inserted to serve as the fourth arm of the bridge. This could be done by switching means carried by the measuring unit. However, it is preferable, particularly where the conversion is desired only at very infrequent times, to effect the conversion by means of an adaptor. This is shown in FIG. 3.

The adaptor in FIG. 3 is generally designated by the reference numeral 90. It includes a plurality of plugs 34', 36' and 38' receivable within sockets 34, 36 and 38 of the measuring unit, and also a plurality of sockets 42', 44' and 46' adapted to receive plugs 42, 44 and 46 of the detector 30. The resistor forming the fourth arm of the bridge when the device is converted for measuring temperature is indicated at 92 and, as shown, is connected between plugs 34' and 38'. Plug 34' is not connected to socket 42 as in the FIG. 2 arrangement, but rather is connected to plug 44, which thereby puts resistors 4 and 6 in series. Plug 36' is connected to plug 46 by means of socket 46'. It will be seen that when adaptor 90 is attached to the measuring unit, and detector 30 is attached to the adaptor, the bridge includes resistors 16 and 18 (with a portion of resistor 64) as two arms thereof, resistors 4 and 6 as the third arm, and resistor 92 as the fourth arm. Since both resistors 4 and 6 will vary equally with temperature, the current through the meter 22 will be an indication of temperature.

In FIG. 3, prong 48 for closing switch 40 has not been shown for the sake of simplicity, although it will be appreciated that it would be included, as by providing a separate socket for it in the adaptor 90.

For purposes of example only, battery 20 may be of six volts; resistors 4 and 6 may each be of 2.5 ohms at 20° C., variable about 10% between the wilting point and field capacity of the soil whose moisture is measured; resistor 16 may be of 11 ohms; resistor 18 may be of 13.2 ohms; resistor 64 may be of 0.8 ohms; resistor 58 may be of 1.5 ohms to provide a potential drop of 1.8 volts maximum; and resistor 94 may be of 5 ohms.

While the invention has been described with respect to measuring moisture in soil, it will be appreciated that it could be used for measuring other forms of liquid, and in other media. Further variations will also be apparent. It is therefore to be understood that the described embodiments of the invention are illustrative only, and that many other embodiments, variations and applications thereof may be made without departing from the spirit or scope of the invention as defined in the following claims.

I claim:

1. A detector for sensing the moisture content of a medium, comprising: a first electrical resistor and a second electrical resistor the resistance of each of which varies with temperature; a moisture-absorbing material the thermoconductance of which varies with the amount of moisture contained therein; and a nonmoisture-absorbing material having approximately the same temperature conductivity factor as said moisture-asborbing material; said first electrical resistor being in heat-conductive relationship with said moisture-absorbing material, and said second electrical resistor being in heat-conductive relationship with said nonmoisture-absorbing material; and connections for connecting said first and second electrical resistors into a measuring circuit to measure the difference in resistance between said two resistors caused by the difference in the rate of heat dissipation resulting from a difference in the thermoconductance of said moisture-absorbing and nonmoisture-absorbing materials.

2. A detector according claim 1, wherein said moisture-absorbing material and said nonmoisture-absorbing material are each in the form of a layer in direct contact with said first and said second electrical resistors, respectively.

3. A detector according to claim 1, further including a plate disposed over both of said electrical resistors, said plate being of high thermic conductance and being formed with an opening for permitting the passage of moisture to the moisture-absorbing material.

4. Apparatus for measuring the moisture content of a medium, comprising a moisture-sensing detector according to claim 1, and a bridge measuring circuit connected thereto such that two arms thereof include said first and said second electrical resistors.

5. Apparatus according to claim 4, wherein means are provided for selectively connecting said first and said second electrical resistors in series to form one arm of the bridge and for introducing into another arm of the bridge a further electrical resistor adapting the apparatus for also measuring temperature.

6. Apparatus according to claim 5, wherein said last mentioned means comprises an adaptor interposable between said bridge measuring circuit and said detector.

7. Apparatus according to claim 4, further including a calibrating resistor in circuit with said bridge measuring circuit for calibrating said measuring circuit.

8. Apparatus according to claim 7, further including a switch having a first position enabling the calibration of the bridge mesuring circuit and a second position enabling the circuit to be used for measuring purposes.

References Cited

UNITED STATES PATENTS

| | | | |
|---|---|---|---|
| 2,343,520 | 3/1944 | Baver et al. | 73—75 |
| 2,526,636 | 10/1950 | Colman | 73—73 |
| 2,869,359 | 1/1959 | Offermann | 73—73 |

FOREIGN PATENTS 867,828   5/1961   Great Britain.

RICHARD C. QUEISSER, Primary Examiner

J. K. LUNSFORD, Assistant Examiner

U.S. Cl. X.R.

73—29